March 8, 1960  J. H. PATON ET AL  2,927,782
APPARATUS FOR CURING THE END CAPS OF FILTER CARTRIDGES
Filed April 5, 1957  3 Sheets-Sheet 2

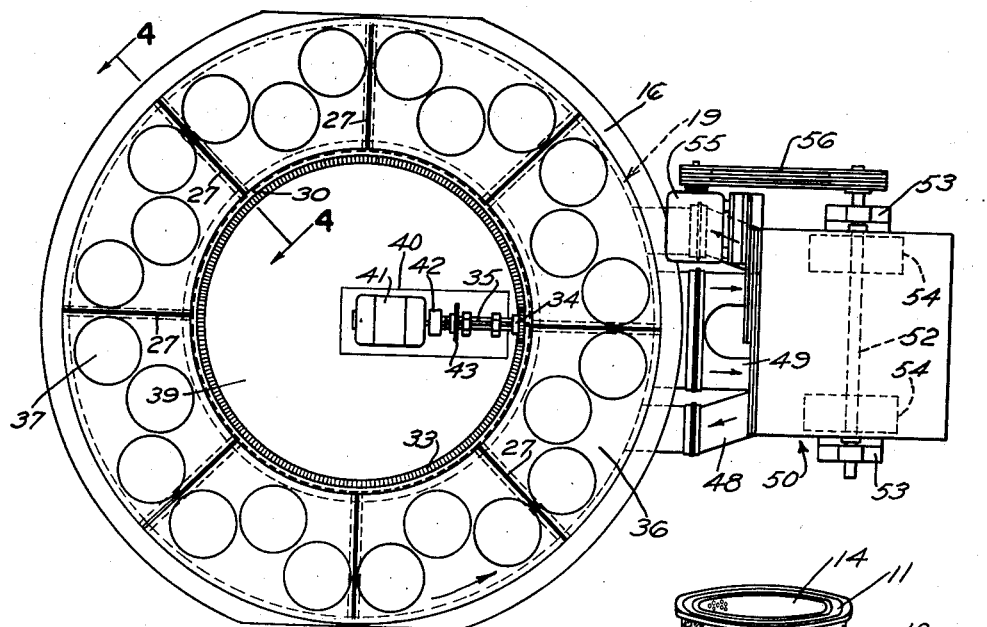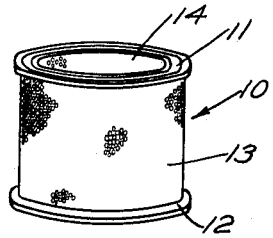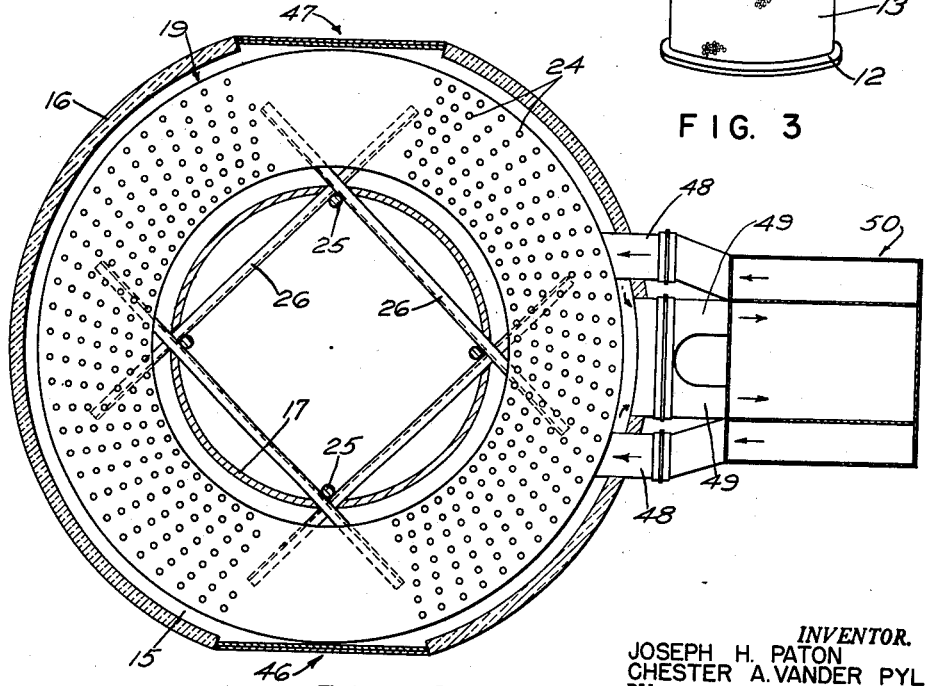

INVENTOR.
JOSEPH H. PATON
CHESTER A. VANDER PYL, JR.
BY
Charles E. Wilson
ATTORNEY

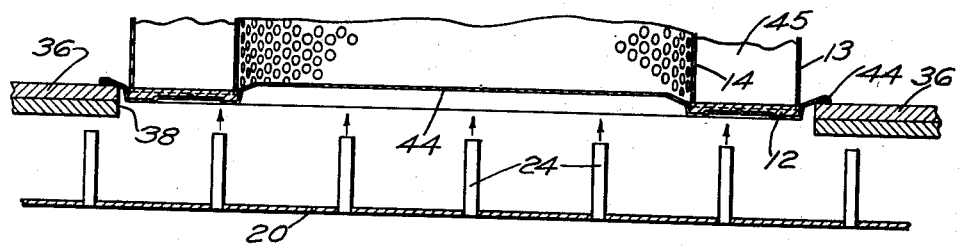
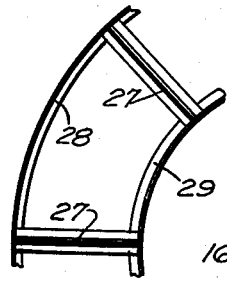
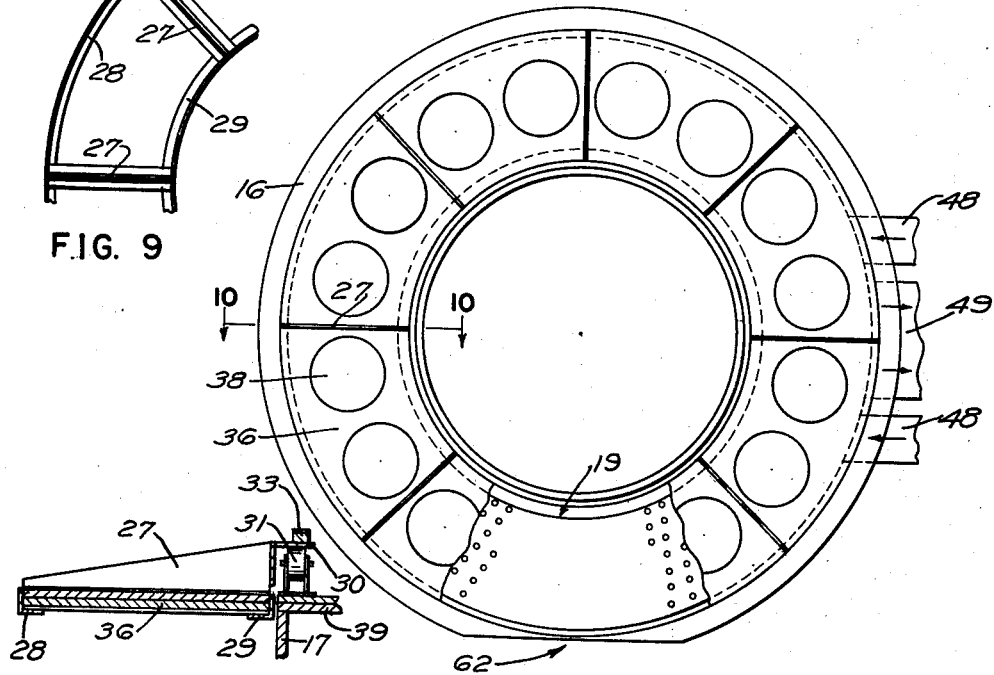
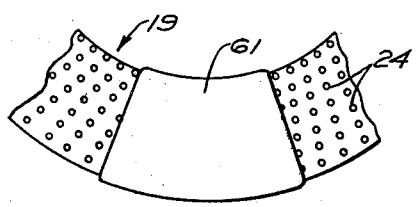
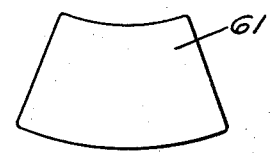

United States Patent Office 2,927,782
Patented Mar. 8, 1960

2,927,782

APPARATUS FOR CURING THE END CAPS OF FILTER CARTRIDGES

Joseph H. Paton, Attleboro Falls, and Chester A. Vander Pyl, Jr., North Attleboro, Mass., assignors to Fram Corporation, East Providence, R.I., a corporation of Rhode Island Application April 5, 1957, Serial No. 650,974

2 Claims. (Cl. 263—7)

This invention relates to apparatus for quickly and uniformly curing the end caps provided at the ends of pleated filter cartridges.

Filter cartridges employing pleated paper as the filter element and having a plastic end cap at each end of the filter element to form a seal are now extensively used as air filter cartridges for internal combustion engines. Such an air filter cartridge forms the subject matter of the Rabbitt et al. Patent No. 2,732,031.

It has been proposed heretofore to use electric heating bars as the heating elements to cure the plastic end caps of such cartridges, but the mold pans for such caps usually have the bottom of the pan bent to provide molding ribs and trough, and therefore do not provide a flat uniform bottom exposed to the electric heating bars. As a result, some portions of the pan bottom are likely to be heated by the electric bars faster than others, and a non-uniform cure results.

The present invention contemplates novel apparatus whereby these plastic mold pans can be heated uniformly and more quickly than heretofore to cure the plastic therein without burning or overheating the plastic.

This uniform and quick cure of the plastic end caps is secured in accordance with the present invention by supporting the plastic containing molds on a moving surface, such as a revolving table having holes in the table to expose the bottoms of the pans, and jets of hot air are directed against the bottoms of the pans. In this manner the pans are quickly and uniformly heated to the desired temperature, and are kept at this temperature without overheating. This is because the pans will not be heated above the temperature of the hot air directed against them. Since the temperature of the air supplied by the jets can be accurately controlled, it is easy to control the maximum temperature to which the pans are subjected.

The plastic used to form these end caps is preferably a vinyl compound such as plastisol, and to cure this material every particle of the plastic dispersion has to be heated to about 325° F. The cure is effected the instant each particle is heated to this temperature. The hot air jets are very satisfactory to heat the mold and its contents quickly to the curing temperature. This can be done in from about 30 to 60 seconds, depending upon the thickness of the molding pan and the amount of plastic to be cured in the pan.

The hot air jets used to heat the mold can be, as above stated, accurately controlled as to temperature, and the time each mold is subjected to the action of the hot air jets can be accurately controlled by regulating the speed at which the table supporting the molds is rotated.

After the end cap at one end of a cartridge is cured, the cartridge is turned upside down and its other end is embedded in the plastic confined in a mold. Then, this second mold is placed on the revolving table to cure the plastic therein. In this manner, both end caps of a pleated cartridge can be quickly cured without overheating the plastic. The revolving table is preferably provided with two loading stations disposed about 180° apart. One end cap is cured as the table travels from the first to the second station, and the other end cap is cured as the table travels from the second station back to the starting point. This facilitates the use of such curing table with an assembly line.

The above and other features of the present invention will be further understood from the following description when read in connection with the accompanying drawings, wherein;

Fig. 1 is a top plan view of the apparatus of the present invention.

Fig. 2 is a view similar to Fig. 1 but with the revolving table removed.

Fig. 3 is a perspective view of a filter cartridge of the type having plastic end caps that can be quickly cured on the apparatus of the present invention.

Figure 4:
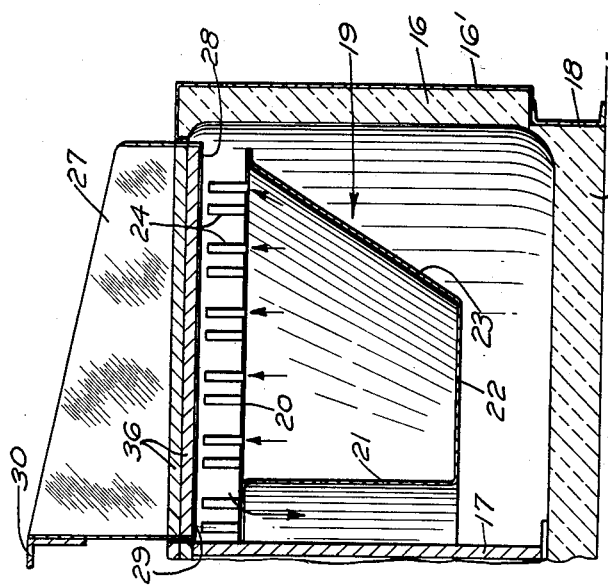

Fig. 4 on a larger scale is a vertical sectional view taken on the line 4—4 of Fig. 1.

Figure 5:
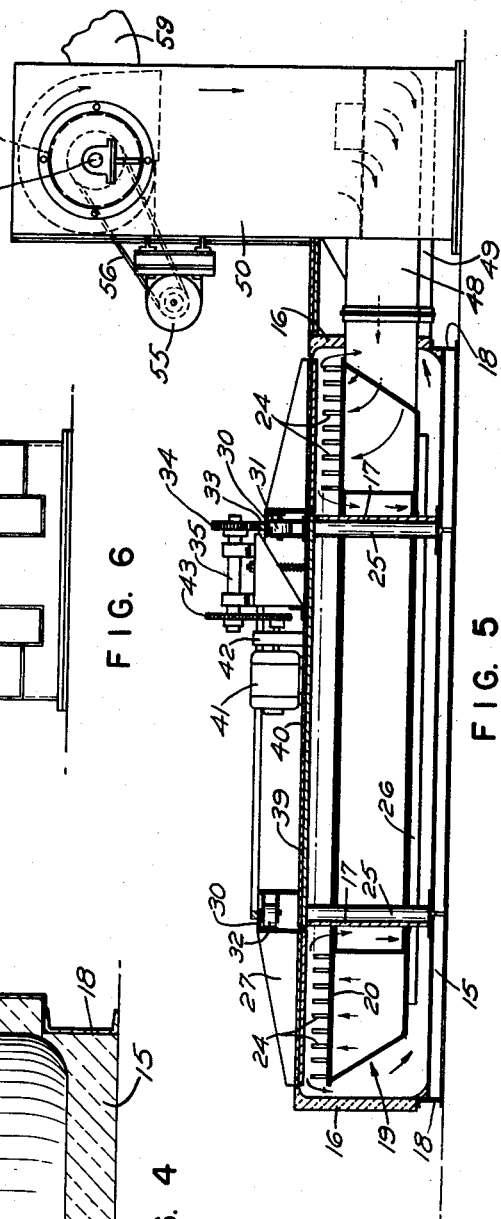

Fig. 5 is a side elevation with parts in section of the apparatus shown in Fig. 1.

Figure 6:
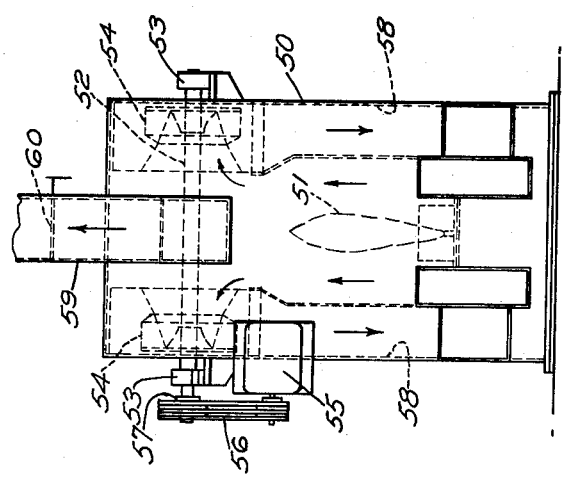

Fig. 6 is an end view of the air heating and air circulating apparatus shown in Figs. 1, 2 and 5.

Fig. 7 on a relatively large scale is a vertical sectional view through the lower portion of a filter element and mold pan resting on the curing table.

Fig. 8 is a modification of the revolving table shown in Fig. 1.

Fig. 9 is a top plan view showing one section of the skeleton frame of the revolving table.

Fig. 10 is a sectional view taken on the line 10—10 of Fig. 8.

Fig. 11 is a plan view showing a number of the hot air jets and a cover for some of these jets; and Fig. 12 is a plan view of the jet cover shown in Fig. 11.

Referring first to Fig. 3 of the drawing, there is shown a filter element of the type that is well adapted to have the plastic end caps thereof cured upon the apparatus of the present invention. This filter element of annular shape is designated in its entirety by the numeral 10 and has a plastic upper end cap 11 and a plastic lower end cap 12. The filter element preferably is formed of pleated paper and this pleated paper as here shown is protected by an outer screen 13 and inner screen 14. The end caps 11 and 12 formed of heat-curable plastic are molded in sheet metal pans to be hereinafter described. The purpose of the present invention is to provide means for heating these pans so as to cure quickly the plastic end cap without overheating the plastic.

Now, referring to Figs. 1, 2 and 4, the apparatus for quickly curing the end caps 11 and 12 preferably comprises a relatively thick floor 15 formed of a heat insulating material, and extending upwardly from this floor is an annular outer wall 16 and annular inner wall 17. Each of these walls preferably is formed of thick heat insulating material, and the exposed outer face of the wall 16 is preferably protected by a layer of sheet metal such as 16'. The wall 16 is shown as resting upon metal beams 18 that surround and enclose the floor 15.

Within the annular space between the walls 16 and 17 there is placed an annular air receptacle or plenum chamber 19. This plenum chamber has an upper horizontally extending wall 20, a vertical inner wall 21, a bottom wall 22, and an inclined outer wall 23. The top wall 20 is provided with a large number of upwardly directed air nozzles 24 disposed in a wide arcuate band.

The plenum chamber 19, as will be apparent from Fig. 5, is supported in spaced relation to the insulating floor 15 by the four upright posts 25, to which are rigidly secured the crossing bars 26, and the floor 22 of the plenum chamber rests upon the projecting ends of these horizontally extending bars 26.

Within the annular space between the fixed upright walls 16 and 17, and above the air nozzles 24, is rotatably mounted the round table which is best shown in Fig. 1. This table comprises an annular frame adapted to receive a number of removable table top sections, to be described, and the table frame is preferably formed of a number of skeleton sections of the general construction shown in Fig. 9. The skeleton section of Fig. 9 extends through an angle of 45° and eight of these sections are bolted or otherwise secured together to make up the skeleton frame shown in Fig. 1 of the drawing. Referring to Fig. 9, it will be seen that the skeleton section or sector here shown comprises two radial bars 27 forming an angle of 45° to each other, and these bars are secured to an outer arcuate bar 28 and inner arcuate bar 29. It will be understood that when eight skeleton sectors such as shown in Fig. 9 are bolted together, the outer arcuate members 28 form a complete outer ring, and the inner arcuate members 29 form a complete inner ring. This inner ring has an inwardly extending annular flange 30 which serves to support the table so that it can be freely rotated. To this end the annular flange 30 rests upon a number of supporting rollers 31, which in turn are supported by the upright posts 25. Another set of rollers 32 is provided to engage the inner face of the ring 29, and these rollers keep the table properly centered with respect to a central axis. On the upper face of the ring 30 is secured an annular rack 33 adapted to be driven by a gear 34 mounted on a horizontally extending shaft 35. In this manner the table is rotated in the annular space between the walls 16 and 17.

The annular skeleton frame just described having the eight sectors shown in Fig. 1 is adapted to receive eight table top sectors 36. Each of these sectors as shown in Fig. 1 is provided with three pan-receiving holes 37. In the modified construction of Fig. 8 each sector 36 is provided with two pan receiving holes 38. The sectors 36 are preferably made of thick sheets of insulating material such for example as bonded asbestos fibers, and as will be seen from Fig. 7, two such asbestos sheets 36 are employed in place of one sheet to obtain additional strength and heat insulating properties. The asbestos sheets forming the table top sectors 36 are cut to fit accurately within the skeleton sector frame shown in Fig. 9 and formed of the metal bars 27, 28 and 29. These bars have lateral flanges on which the sector 36 rests. The table sectors 36 can be readily removed from the skeleton frame and replaced by other sectors having different size holes. This is desirable in order to adapt the plastic curing table of the present invention to receive cartridge end caps of various sizes. The inner and outer diameters of the revolving table just described are such that the table will fit closely within the annular space between the upright walls 16 and 17, so as to provide a minimum gap between the revolving table and the upper ends of the fixed walls 16 and 17 through which air may enter or escape during the plastic curing operation.

The space lying within the annular wall 17 is preferably provided with a floor or cover 39 supported by the upright posts 25, and upon this floor is secured the base plate 40 on which is mounted a variable speed electric motor 41 and a reducing gear box 42. The latter is provided with a sprocket wheel adapted to drive a chain 43, which in turn drives a sprocket wheel secured to the horizontally extending shaft 35. The arrangement is such that the curing table may be rotated at any desirable speed by varying the speed of the motor 41, which through the mechanism described will drive the gear 34 that meshes with and drives the annular rack 33 secured to the revolving table as above described.

The plastic end caps 11 and 12 which serve to seal the opposite ends of the filter element of the cartridge 10 are formed by depositing a viscous plastic in sheet metal molds such as indicated by 44 in Fig. 7. These molds have an annular trough in which the plastic material may be poured while in a viscous condition. This plastic material is allowed to set for a short time in such mold to seek its own level therein. Then the zigzag end of a pleated paper filter element 45 (see Fig. 7), together with an outer protecting wall 13 and inner protecting wall 14 of the cartridge, when used, are embedded in the plastic material indicated by 12 in Fig. 7. The mold pan 44 containing the plastic material 12 and having the cartridge parts 13, 14 and 45 embedded therein is now placed over one of the openings 37 of Fig. 1 or opening 38 formed in the table top of Fig. 7. The mold pans 44 are preferably formed of relatively thin sheet metal that can be heated quickly.

The table top above described is rotated, it may be assumed, in the direction indicated by the arrow in Fig. 1 and as it rotates, one workman may stand at a loading position 46 and another workman stand at a second loading position 47, disposed about 180° from the first loading position. When the apparatus of the present invention is in operation, a workman standing at the loading position 46 will, as the table rotates, remove a filter cartridge 10 from a hole 36 of the table, after the end of such cartridge has been cured. The workman will also place a new cartridge with its pan over such hole to cure this end cap. All holes 37 should be covered above the jets 24 to keep the hot air from the jets from escaping through such holes.

The temperature of the air supplied by the air nozzles 24, and the speed at which the curing table rotates, preferably are such that the end cap 12 will be cured by the time the table has advanced the cap from the loading position 46 to the second loading position 47, it is removed by a workman from the table, turned upside down and the remaining end of the pleated paper is embedded in plastic container in a second mold to form a second end cap 11. The cartridge is then placed back on the revolving table over one of the holes 37, so that this second end cap may be cured by the time the table advances it from the loading position 47 to the starting point 46. Upon arriving here the operation of curing both end caps of the cartridge 10 is completed. The cartridge is then removed from the curing table and allowed to cool to approximately room temperature; the mold pans 44 can then be stripped from the cartridge.

Hot air is supplied at high speed and under high pressure to the numerous air jets 24. To this end the air which is heated, by means to be described, is forced into the plenum chamber 19 through the inlet pipes 48 as best shown in Fig. 2. The only way the air delivered by these pipes into the plenum chamber can escape therefrom is to pass out through the air nozzles provided in the upper wall 20 of this chamber to strike against the lower face of the revolving table and against the pans resting in the holes 37. The air delivered by the nozzles 24 passes downwardly as indicated by the arrow in Fig. 5 to enter the chamber surrounding the plenum receptacle 19. This chamber is defined by the revolving table, upstanding annular walls 16 and 17 and floor 15. The air in this chamber passes out of the same through the air ducts 49 best shown in Fig. 2. The arrangement is such that the hot air supplied to the air nozzles 24 is returned to heating means, to be described, and is used over and over.

The air supplied to the nozzles 24 is heated in the upstanding tower 50 where it is exposed to the flame 51 of burning gas. In the upper portion of this tower, or closed chamber, is mounted a horizontally extending shaft 52, the outer ends of which are journaled in bearings 53, and rigidly secured to this shaft are the spaced fans 54. This fan shaft is driven by an electric motor 55 supported by the tower 50. The motor drives the belts 56 that cooperate with pulleys 57 mounted on the shaft 52 and serve to drive this shaft and the fans 54. The arrangement is such that the hot air to be supplied to the plenum chamber 19 passes downwardly in the channels 58 to the ducts 48, and the air drawn out of the chamber below the revolving table passes out through the ducts 49 and upwardly to the fans in the central portion of the tower to be heated by the flame 51. In this manner the air is repeatedly heated and circulated to and from the under face of the revolving table. The temperature of such air is preferably maintained at about 600° F. by a thermostat, and the air passes out of the nozzles 24 at a velocity of about 7000 ft. per minute.

It is desirable to provide exhaust means for removing some of the air used in the plastic curing operation and to provide a slight down draft at the edges of the revolving table, so that hot air will not escape adjacent the revolving table where people are working. To this end there is preferably provided an exhaust pipe 59 which leads to a point outside of the building. Air is sucked outwardly through this exhaust pipe by a fan, not shown. The rate at which air may be exhausted through this pipe is preferably controlled by an adjustable damper 60, see Fig. 6.

In some filter cartridges of the type indicated by 10, one end cap may be larger than the other, in which case the time required to cure the larger end cap will be slightly greater than the time required to cure the smaller end cap. In order to expose each end cap to the hot air jets for just the required period of time to effect the proper cure, it is desirable to provide means whereby the time that each end cap is exposed to the heat of the air jets can be varied. This proper timing of the exposure period is easily secured by providing a cover plate such as indicated by 61 in Figs. 11 and 12. This cover plate may be a sheet of metal or other heavy material cut to the sector shape shown, and which simply rests on top of a number of air nozzles 24 as shown in Fig. 11. The weight of this sector 61 may be sufficient to retain it in place, and it can be shifted by hand to either the left or the right in Fig. 11 to vary as desired the time the pans are exposed to the hot air jets from one loading station to the other. That is by covering some nozzles and uncovering others, the number of jets acting upon a pan is varied.

In most cases, it is believed desirable to employ two loading stations disposed about 180° apart as above described and shown in Figs. 1 and 2. In some cases, however, it may be desirable to provide only one loading station 62 as shown in the modified construction of Fig. 8. It will be noted that at each loading station the wall is flattened, as shown, so that the workman may stand closer to the revolving table to make it easier for him to place the loading pans over the holes 37 and remove them therefrom. As shown in Fig. 2 the air nozzles 24 are omitted from an area of the plenum chamber 19 at the loading stations 46 and 47. They are omitted at these loading stations so that hot air will not pass upwardly through the holes 37 at the time one pan is being removed from a hole and another pan is placed over the hole in the position in which it is shown in Fig. 7.

It will be understood from the foregoing that by employing the construction of the present invention jets of hot air are directed against the bottoms of the molding pans for the desired length of time. In this manner each pan is quickly heated to the desired temperature and maintained at this temperature, to quickly cure the end cap therein without burning or over-curing any portion of such cap. While the cartridge 10 is shown as circular in shape, it may have an elliptical or other annular shape.

Having thus described our invention, what we claim and desire to protect by Letters Patent is:

1. Apparatus for quickly curing the plastic end caps of pleated filter elements while such cap-forming plastic lies in molding pans and has an end of the pleated element embedded in this uncured plastic, comprising a plenum chamber, a revolving table in the upper part of such chamber for supporting a number of such pans and having pan-receiving holes through which the bottoms of the pans are exposed, power means for rotating the table to advance said pans to loading positions disposed about 180° apart around the table, numerous air nozzles disposed below said table close to its lower face and arranged in wide arcuate bands that extend between the loading stations, said nozzles being arranged to direct the full force of the air against the bottoms of the moving pans to deliver jets of air at a uniformly high temperature and high pressure against the pans at a speed of several thousand feet per minute as the pans are advanced by the travel of the table to cure the plastic uniformly in a pan in one minute or less, and said nozzles being located below the table throughout a complete circle except for the area of each loading station.

2. Apparatus for quickly curing plastic as defined in claim 1, wherein a movable cover of somewhat greater area than a station is provided at one station and can be shifted to block off some of the nozzles to thereby change the cure time between two stations.

References Cited in the file of this patent

UNITED STATES PATENTS

| | | |
|---|---|---|
| 485,300 | Rudd | Nov. 1, 1892 |
| 620,139 | Hysore | Feb. 28, 1899 |
| 1,643,650 | Williams | Sept. 27, 1927 |
| 1,774,161 | Wetmore | Aug. 26, 1930 |
| 1,786,142 | Wyman | Dec. 23, 1930 |
| 2,007,619 | Staniford et al. | July 9, 1935 |
| 2,266,627 | Ehret | Dec. 16, 1941 |
| 2,385,962 | Barnett | Oct. 2, 1945 |
| 2,392,283 | Ferre | Jan. 1, 1946 |
| 2,522,657 | Wilcox | Sept. 19, 1950 |
| 2,536,048 | Flanagan | Jan. 2, 1951 |
| 2,557,439 | Kmentt | July 19, 1951 |
| 2,650,554 | Faulds | Sept. 1, 1953 |
| 2,682,390 | Pollard | June 29, 1954 |
| 2,721,566 | Brucker | Oct. 25, 1955 |
| 2,640,414 | Jensen | June 2, 1956 |
| 2,762,320 | Ireland | Sept. 11, 1956 |
| 2,771,156 | Kasten et al. | Nov. 20, 1956 |
| 2,834,986 | Bailey et al. | May 20, 1958 |